US006422622B1

(12) United States Patent
Bernard

(10) Patent No.: US 6,422,622 B1
(45) Date of Patent: Jul. 23, 2002

(54) MAGNET INSTALLATION AND REMOVAL DEVICE

(76) Inventor: Robina B. Bernard, 78 Cliffside Drive, Huttonville, Ontario (CA), L0J 1B0

(*) Notice: Subject to any disclaimer, the term of this patent is extended or adjusted under 35 U.S.C. 154(b) by 0 days.

(21) Appl. No.: 09/635,786

(22) Filed: Aug. 11, 2000

(51) Int. Cl.[7] .............................. A47F 13/06; B25J 1/00

(52) U.S. Cl. ........................................ 294/24; 294/19.1

(58) Field of Search ........................ 294/2, 19.1, 22–24, 294/26, 61, 121; 81/53.1, 53.11, 487; 248/317, 339, 340, 343, 544

(56) References Cited

U.S. PATENT DOCUMENTS 103,627 A 5/1870 Lamb
1,512,315 A 10/1924 Sanford
1,665,988 A * 4/1928 Smith .................... 294/19.1 X
1,758,504 A * 5/1930 English ................. 294/19.1 X
2,084,617 A * 6/1937 Kehl ..................... 294/19.1 X
2,291,593 A * 7/1942 Hubbard .................... 294/19.1
2,488,396 A * 11/1949 Gottholm ............... 294/19.1 X
3,150,460 A * 9/1964 Dees ..................... 294/19.1 X
5,052,733 A * 10/1991 Cheung et al. ............ 294/19.1
5,188,332 A 2/1993 Callas
5,575,470 A * 11/1996 Sherman ................ 294/19.1 X
5,746,461 A * 5/1998 Broberg ..................... 294/19.1
5,938,255 A * 8/1999 Rose et al. ................ 294/19.1

FOREIGN PATENT DOCUMENTS

JP 06121423 4/1994

* cited by examiner

*Primary Examiner*—Johnny D. Cherry
(74) *Attorney, Agent, or Firm*—Arne I. Fors

(57) ABSTRACT

An installation and removal device comprising an installation head and a pole extension for a magnet anchor comprising a magnet having a ring of a predetermined diameter tethered to the magnet. The installation head comprises an elongated, non-magnetic cylindrical body having a cylindrical lug at one end for receiving and supporting the magnet anchor ring and a hook in the shape of a corkscrew extending laterally from the cylindrical body. A threaded socket is formed at the opposite end of the cylindrical body for removably attaching an elongated pole.

15 Claims, 3 Drawing Sheets

MAGNET INSTALLATION AND REMOVAL DEVICE

BACKGROUND OF THE INVENTION

1. Field of the Invention

This invention relates to a magnet installation and removal device, and, more particularly, relates to a magnet anchor and to an installation device for installing and removing the magnet anchor from an elevated overhead magnetic surface.

2. Description of the Related Art

It is well-known to suspend signs, banners, balloon displays and the like objects from metal ceiling structures such as steel channels and tile suspension strips by means of magnets and mechanical devices. U.S. Pat. No. 5,188,332 issued Feb. 23, 1993 shows a magnet strip for attachment to a metal ceiling strip by means of an elongated pole for supporting a hanger hook made of a plastic material or of a non-metallic metal such as aluminum.

U.S. Pat. No. 5,052,733 issued Oct. 1, 1991 discloses an installation pole for installing a ceiling anchor, including a magnetic anchor, for supporting a ceiling sign.

The prior art installation poles are mechanically complex necessitating release mechanisms, or ladders are required to attach the ceiling anchors to the ceiling structures.

It is a principal object of the present invention accordingly to provide a novel magnet anchor and an installation pole for facile installation of the magnet anchor to a magnetic ceiling structure.

Another object of the invention is the provision of an installation head attachable to an elongated extension pole.

SUMMARY OF THE INVENTION

In its broad aspect, the installation pole of the invention for installing and removing a magnet anchor having a ring of a predetermined diameter tethered to the magnet anchor for anchoring an object to and removing an object from a magnetic structure comprises an elongated, cylindrical non-magnetic installation head having a cylindrical lug at one end for receiving the ring and for supporting the magnet thereon for elevating the magnet to the magnetic ceiling structure, a hook extending laterally from the installation head in proximity to the lug for engaging the ring for removing the magnet from the magnetic ceiling structure, and an elongated pole removably attachable to the installation head.

The hook preferably is a corkscrew extending radially from the installation head. The extensible pole preferably is an elongated rod having a threaded end connection made of wood, plastic or aluminum alloy.

The installation head for use with an elongated pole comprises an elongated, cylindrical non-magnetic body preferably formed of a plastic material having a cylindrical lug at one end for receiving a ring of a magnet anchor and for supporting the magnet anchor thereon for elevating the magnet anchor to a magnetic ceiling structure, a corkscrew hook extending laterally from the installation head in proximity to the lug for engaging the ring for removing the magnet anchor from the magnetic ceiling structure, and a threaded socket at the opposite end for receiving a mating threaded end of a pole extension.

BRIEF DESCRIPTION OF THE DRAWING

The magnet anchor and installation pole of the invention will now be described with reference to the accompanying drawings, in which.

DESCRIPTION OF THE PREFERRED EMBODIMENT

Figure 1:
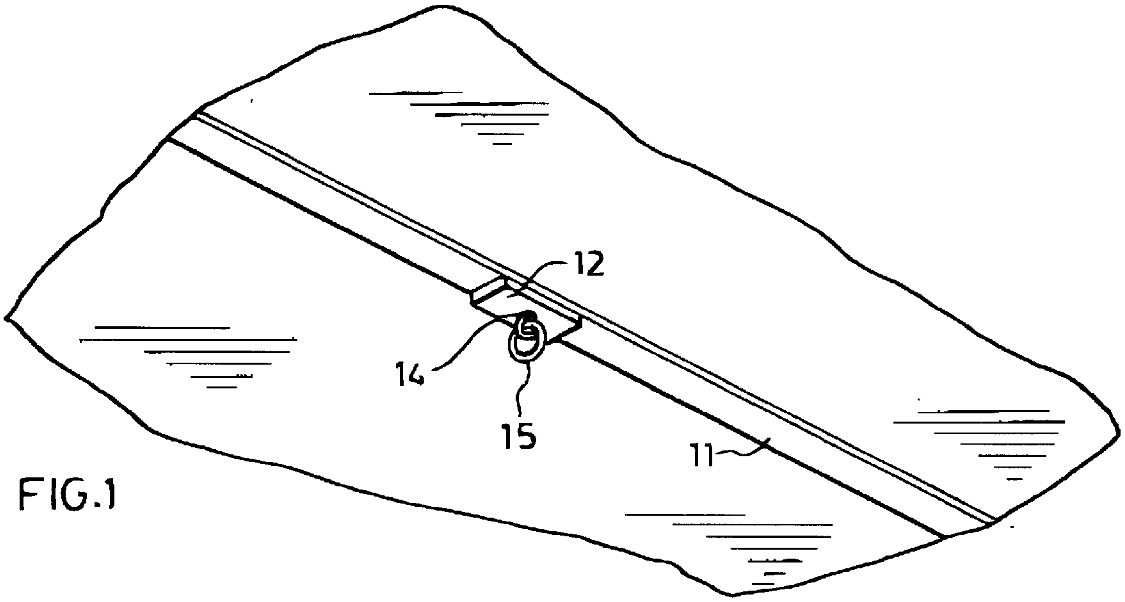
FIG. 1 is a fragmentary perspective view of the magnet anchor of the invention attached to a steel ceiling strip.

The magnet anchor 10 of the invention shown in an operative position attached to a magnetic ceiling strip 11 in FIG. 1 preferably comprises a rectangular magnet body 12 with an elongated eye or tether 14 depending therefrom. Tether 14 preferably is rivetted to the centre of the magnet by a rivet 16, shown more clearly in FIGS. 2 and 4, such that it is free to rotate. A ring 15 fitted into tether 14 is adapted to receive an object to be supported by the magnet anchor such as a sign, banner, balloon or balloon display.

Figure 2:
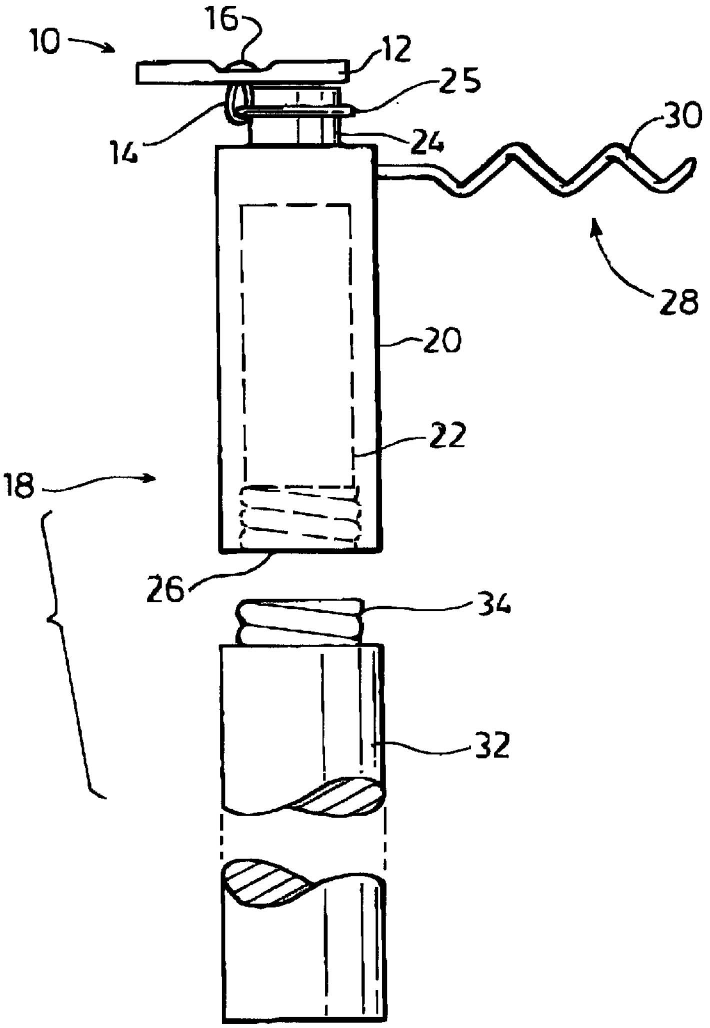
FIG. 2 is a side elevation of the installation pole of the invention operatively engaging the magnet anchor for elevating the anchor.
Figure 3:
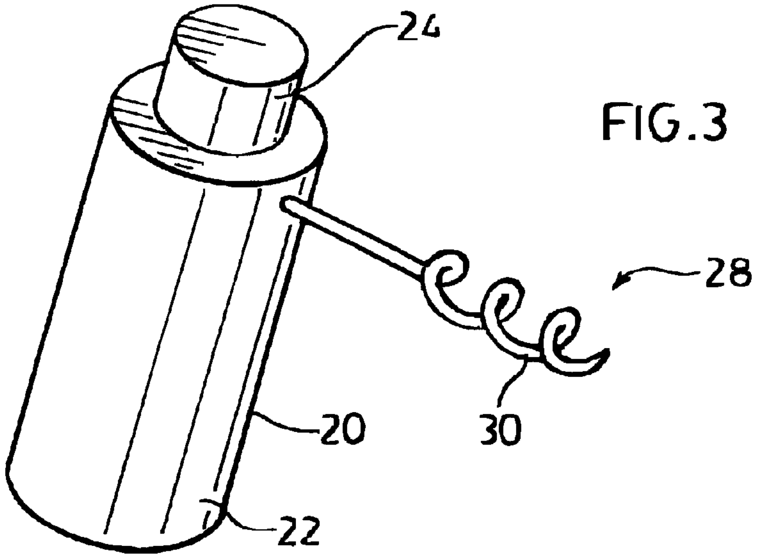
FIG. 3 is a perspective view of the installation head shown in FIG. 2.

The operative combination of magnet anchor 10 and installation pole 18 is illustrated in FIGS. 2 and 3. Installation pole 18 comprises an installation head 20 formed of a non-magnetic material such as nylon plastic, wood or aluminum alloy having an elongated hollow cylindrical body 22 with a cylindrical lug 24 depending from one end and an internally threaded cavity 26 (shown by broken lines in FIG. 2) formed in the opposite end. A hook 28, preferably in the shape of a corkscrew 30, is secured to and depends radially from body 22 in proximity to lug 24, shown more clearly in FIG. 3, for reasons which will become apparent as the description proceeds. An elongated wood, plastic or metal pole extension 32 having a threaded end 34 adapted to mate in snug threaded engagement with threaded cavity 26 permits raising and lowering of installation head 20. Pole extension 32 may also include a segmented pole having two or more sections with threaded connections or a telescopic pole well known in the art.

In operation, ring 15 having an object to be suspended (not shown) attached thereto is fitted onto lug 24 as shown in FIG. 2 with magnet anchor 12 resting on the flat distal end of lug 24. Lug 24 preferably is flattened by removal of a chord, as depicted by numeral 25 in FIG. 3, to accommodate tether 14. The magnet anchor 10 with attached object is raised to a magnetic surface such as steel ceiling strip 11 by elongated pole extension 32 coupled to installation head 20. Upon contact of magnet anchor 10 to the magnet strip 11, installation pole 18 is retracted.

Figure 4:
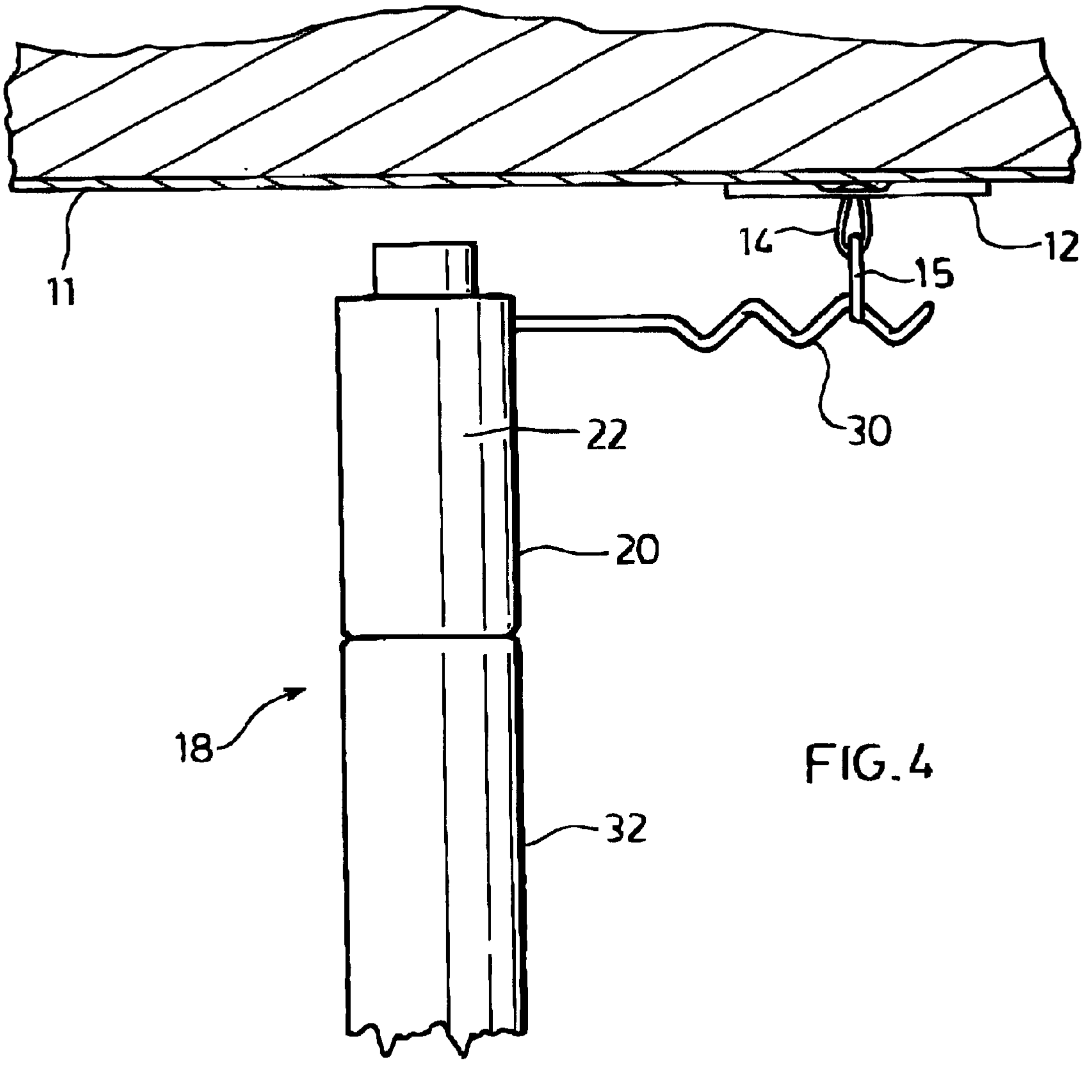
FIG. 4 is a side elevation of the said installation pole preparatory to removing the magnet anchor from the ceiling strip.

To remove magnet anchor 10 from strip 11, the installation head 20 with corkscrew hook 28 is raised by pole extension 32 and ring 15 engaged by corkscrew 30, as shown in FIG. 4, to permit detachment of the magnet anchor 10.

Figure 5:
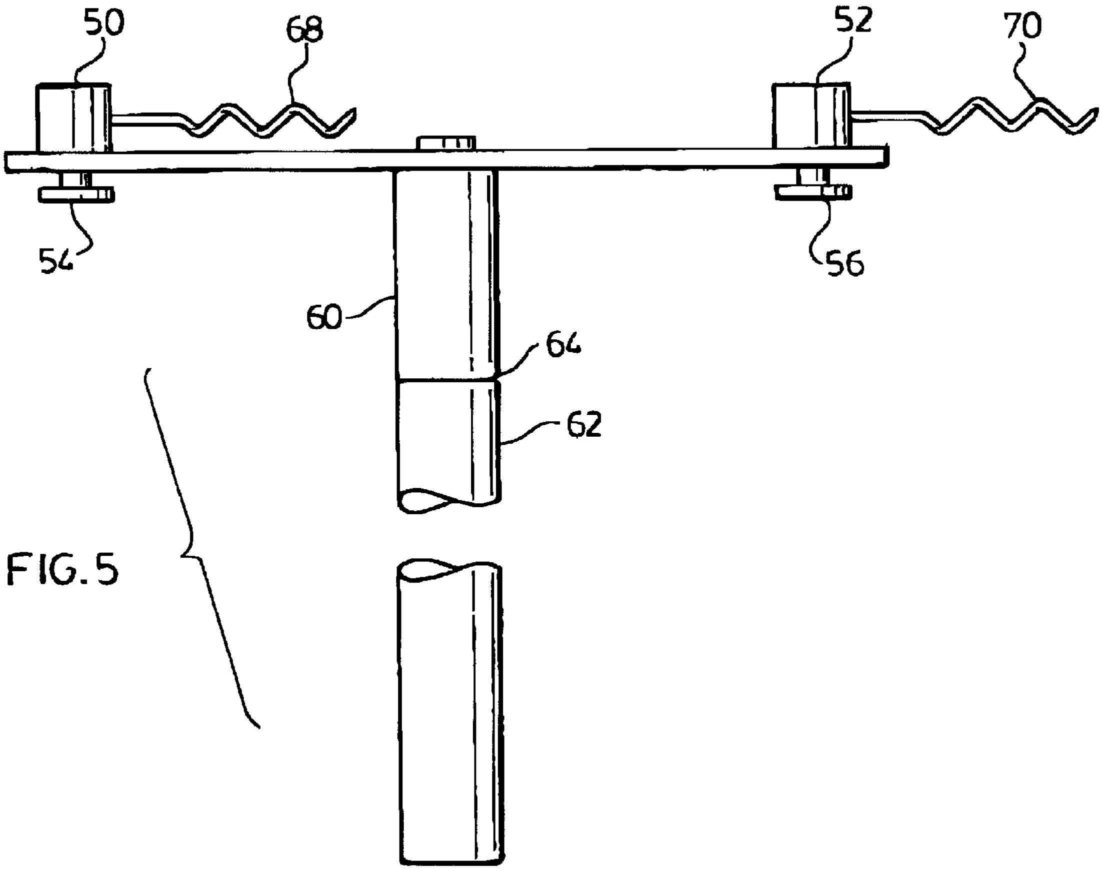
FIG. 5 is a side elevation of an embodiment of installation pole having a pair of magnet anchor suspension and removal means.

FIG. 5 illustrates another embodiment of the invention for multiple installations and removals of a plurality of magnet anchors with a single lift in which a pair of cylindrical lugs 50, 52 or a plurality of cylindrical lugs are mounted for rotation in a spaced-apart relation by mounting bolts 54, 56 on a linear or arcuate support bar 58. Support bar 58 is mounted on an installation head 60 which is threadably coupled at 64 to an extension pole 62.

Each of lugs 50, 52 has a radial corkscrew hook extension 68, 70 which can be pivoted to an inoperative position such as depicted by corkscrew 68 when lifting a magnet anchor or can be pivoted to an operative position such as depicted by corkscrew 70 when engaging a magnet anchor ring for detaching and lowering the magnet anchor from a magnetic ceiling strip. Multiple installations with a single lift are advantageous for banners, swagging and signs requiring multiple, spaced-apart attachment points.

It will be understood, of course that modifications can be made in the embodiment of the invention illustrated and described herein without departing from the scope and purview of the invention as defined by the appended claims.

What is claimed is:

1. An installation pole for installing and removing a magnet anchor having a ring of a predetermined diameter tethered to the magnet anchor for anchoring an object to and removing an object from a magnetic ceiling structure comprising an elongated, cylindrical non-magnetic installation head having a cylindrical lug at one end for receiving the ring and for supporting the magnet anchor thereon for elevating the magnet anchor to the magnetic ceiling structure, a corkscrew hook extending laterally from the installation head in proximity to the lug for engaging the ring for removing the magnet anchor from the magnetic ceiling structure, and an elongated pole removably attachable to the installation head.

2. An installation pole as claimed in claim 1 in which the corkscrew hook extends radially from the installation head.

3. An installation pole as claimed in claim 2 in which the pole is extensible.

4. An installation pole as claimed in claim 3 in which the extensible pole is an elongated rod having a threaded end connection.

5. An installation pole as claimed in claim 1 in which the installation pole is selected from the group consisting of wood, plastic and aluminum alloy.

6. An installation head for use with an elongated pole comprising an elongated, cylindrical non-magnetic body formed of a rigid material having a cylindrical lug at one end for receiving a ring of a magnet anchor and for supporting the magnet anchor thereon for elevating the magnet anchor to a magnetic ceiling structure, a corkscrew hook extending laterally from the installation head in proximity to the lug for engaging the ring for removing the magnet anchor from the magnetic ceiling structure, and a threaded socket at an opposite end for receiving a mating threaded end of the pole.

7. An installation head as claimed in claim 6 in which the corkscrew hook extends radially from the installation head.

8. An installation pole for installing and removing a plurality of magnet anchors each having a ring of a predetermined diameter tethered to a magnet anchor for anchoring an object to and removing an object from a magnetic ceiling structure, comprising a plurality of elongated, cylindrical non-magnetic installation heads defining a cylindrical lug at one end for receiving a ring and for supporting a magnet thereon for elevating the magnet anchor to a magnetic ceiling structure, a base for supporting the installation heads equispaced thereon, a hook extending laterally from at least one installation head in proximity to the lug for engaging the ring for removing the magnet anchor from the magnetic ceiling structure, and an elongated pole removably attachable to the base.

9. An installation pole as claimed in claim 8 in which the hook is a corkscrew extending radially from the installation head.

10. An installation pole as claimed in claim 8 in which the pole is an elongated rod having a threaded end connection.

11. An installation pole as claimed in claim 8 in which each installation head has a hook extending laterally therefrom in proximity to the lug.

12. An installation head for use with an elongated pole comprising a plurality of elongated, cylindrical non-magnetic installation heads defining a cylindrical lug at one end for receiving a ring and for supporting a magnet thereon for elevating the magnet anchor to a magnetic ceiling structure, a base for supporting the installation heads equispaced thereon, a hook extending laterally from at least one installation head in proximity to the lug for engaging the ring for removing the magnet anchor from the magnetic ceiling structure, and a threaded socket formed on the base for receiving a mating threaded end of the pole.

13. An installation head as claimed in claim 12 in which the hook is a corkscrew extending radially from the at least one installation head.

14. An installation head as claimed in claim 12 in which each installation head has a hook extending laterally therefrom in proximity to the lug.

15. An installation head as claimed in claim 14 in which each hook is a corkscrew extending radially from the installation head.

* * * * *